United States Patent
Borchelt et al.

[11] Patent Number: 5,992,352
[45] Date of Patent: Nov. 30, 1999

[54] DOG HALTER

[76] Inventors: Peter L. Borchelt, 2465 Stuart St., Brooklyn, N.Y. 11229; Victoria L. Voith, 387 N. 26th St., Apt. 10, Kalamazoo, Mich. 49004

[21] Appl. No.: 08/612,098

[22] Filed: Mar. 7, 1996

[51] Int. Cl.⁶ .................................................. A01K 25/00
[52] U.S. Cl. ............................................ 119/856; 119/831
[58] Field of Search ..................................... 119/792, 831, 119/856, 863, 907; 54/24

[56] References Cited

U.S. PATENT DOCUMENTS

| | | | |
|---|---|---|---|
| 321,957 | 7/1885 | Enoch | 54/24 |
| 780,879 | 1/1905 | Foster . | |
| 1,325,061 | 12/1919 | Veal | 54/24 |
| 1,474,231 | 11/1923 | Brown | 119/831 |
| 1,746,403 | 2/1930 | Mulcahy . | |
| 2,622,381 | 3/1952 | Mundell | 54/24 |
| 3,273,311 | 9/1966 | Henry | 54/24 |
| 4,337,610 | 7/1982 | Taylor | 54/24 |
| 4,483,275 | 11/1984 | De Groot | 119/831 X |
| 4,566,255 | 1/1986 | De Groot | 54/24 |
| 4,589,248 | 5/1986 | Ruddock et al. | 54/24 |
| 4,621,591 | 11/1986 | Anderson et al. | 119/856 |
| 4,741,288 | 5/1988 | Anderson et al. | 119/856 |
| 4,838,206 | 6/1989 | Anderson et al. | 119/856 |
| 5,038,717 | 8/1991 | Bent | 119/907 X |
| 5,079,904 | 1/1992 | Berube | 54/24 X |

OTHER PUBLICATIONS

"The Promise System"—Good Dog!, Nov./Dec. 1991, pp. 26–28.

*Primary Examiner*—Robert P. Swiatek
*Assistant Examiner*—Elizabeth Shaw
*Attorney, Agent, or Firm*—Abelman, Frayne & Schwab

[57] ABSTRACT

A dog halter which includes interconnected neck, side, and cheek straps. The nose and neck straps are substantially independent such that, when desired, the force exerted by the dog handler is independently transmitted to the nose strap for effectively maintaining the dog's mouth in closed condition. The various components are preferably formed of a flexible material, such as a braided fabric, and includes a size adjustment means for adapting the halter to various size dogs.

1 Claim, 3 Drawing Sheets

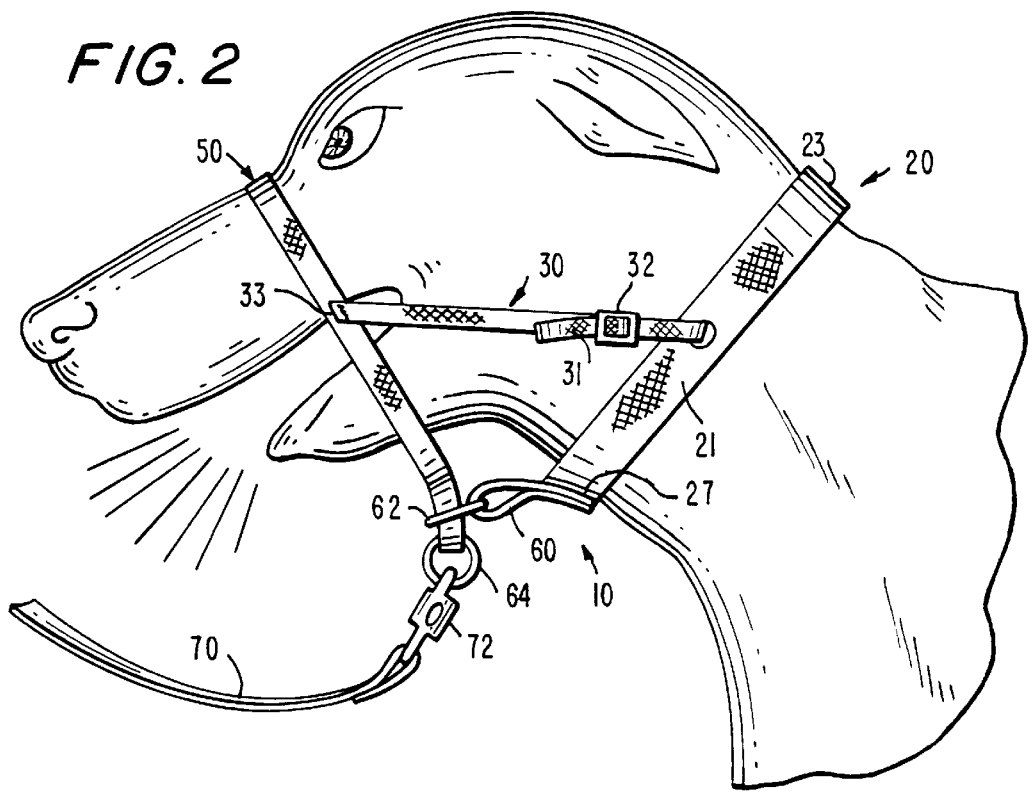
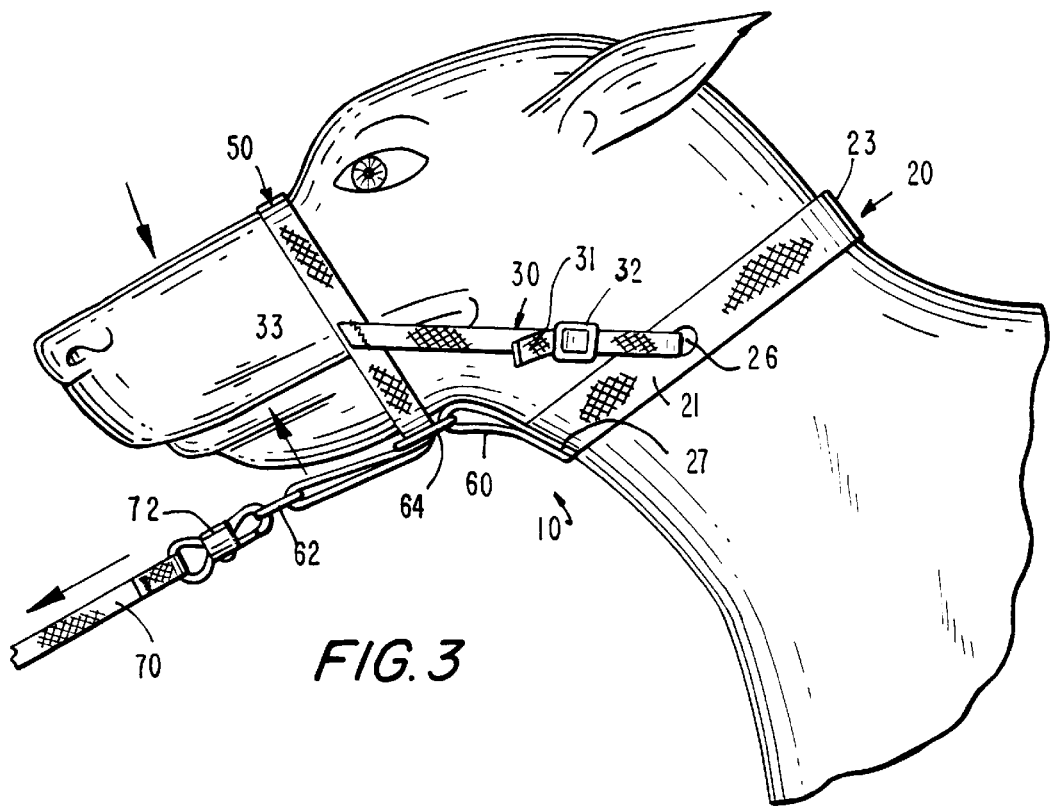

DOG HALTER

FIELD OF THE INVENTION

The present invention relates to a dog halter and more particularly to a halter which improves control of the dog and its behavior of pulling and barking. The present halter includes interconnected neck, side and nose straps. The nose loop can be directly connected to a leash such that tension applied by pulling on the leash is directly applied to the nose loop. This transmits and effectively increases the operative force such that a minimum force applied by the trainer/owner will result in a significant greater applied force, which rapidly prevents the dog from pulling while closing the dog's mouth to reduce, stop and/or prevent barking. The neck, side and nose straps are advantageously flexible, and adjustable in size, so as to comfortably and readily adapt the halter to different size dogs.

BACKGROUND OF THE INVENTION

Various harnesses/collars/halters have previously been proposed for dogs and other animals to guide and control their movement. For dogs, it is most desirable that such a device prevent the dog from pulling on the leash 1) to reduce the strength required by the handler to control the dog, 2) prevent or reduce the counterforce exerted by the dog in response to the tension applied by the handler, thereby permitting the dog to engage in exploratory and elimination behaviors during a walk that can be inhibited when a dog is exerting counterforce, and 3) prevent or reduce barking and lunging behavior and fearful pulling on the leash, and the counterforce that can escalate these behaviors. It is also desirable that such a halter be able to facilitate training the dog to perform standard dog obedience tasks such as "sit", "down", "heel", "stay" and "come." Such training and behavioral control can proceed in an extremely effective manner by independently controlling the tightening of a strap which is looped around the dog's nose. The pulling of the leash tightens this loop, transmitting pressure to the nose loop when it is desired to prevent pulling or barking. This is a very effective obedience training and behavior problem solving procedure.

It is also desirable that such a halter be comfortable for the dog so that the dog readily acclimates to wearing it and does not engage in repeated attempts to remove it. The present design of a halter with adjustable side straps and use of light weight flexible material for construction is more comfortable for the dog than previously available halters. The adjustable side straps, adjustable neck strap, and adjustable nose loop permit customized fit for the size and shape of an individual dog's head. The adjustable side straps permit changes in the length of the side strap between the nose loop and the neck strap, thereby allowing the nose loop to be positioned at the optimal site on an individual dog's nose. Such positioning should prevent pulling while permitting closing of the dog's mouth and minimizing the ability of the dog to paw the nose loop off while being placed sufficiently far forward that the loop does not rub in the dog's eyes. The present design also has adjustability of the nose loop and neck strap. The nose loop can be adjusted by tying a knot at various positions above the ring to which the leash attaches. This allows the nose loop to be adjusted so that it is sufficiently large for the dog to eat, drink, yawn, pant and open its mouth normally when control is not required, but not so large that the dog can paw the lower portion of the nose loop into its mouth and chew it. The neck strap also is adjustable so that it can be fitted appropriately around the neck of any sized dog.

The halter includes an interconnected neck strap, a pair of side straps and a nose loop. All the straps are advantageously flexible, and, for example, may be formed of a braided fabric. The halter may be placed on, or removed from the dog, by a releasable bracket within the neck strap. To maximize the universality of the present halter, the neck, side and nose straps are readily adjustable in length, so as to customize the halter to the size of the particular dog. The connection of the various straps provides for independent movement of the nose from the neck strap.

The nose loop can be directly connected to the leash, such that the force applied by the leash, when it is desired to prevent the dog from pulling or barking, is exerted independent of the neck strap. This provides enhanced control at the leash. Conversely, if the control is via the nose and neck straps as on prior art halters, it is difficult for the handler to maintain control of a large or strong dog, and is very difficult to close the dogs' mouth. Under such prior systems the dog will still be able to exert a great deal of counterforce. Conversely, the present halter's control by the nose loop, operating independently of the neck loop, is substantially easier. Less effort is required because the dog is restricted from pulling forward by force on the nose rather than the force on the neck and nose.

SUMMARY OF THE INVENTION

The halter of the present invention includes a flexible neck strap in the form of a loop, which is connected at two spaced locations to a pair of flexible side straps. The opposite ends of the side straps are connected to spaced locations along the nose strap, which are intended to lie against opposed sides of the dogs nose. A first loop connector is attached to a location along the neck strap which is positioned to lie under the dog's neck. The nose strap freely extends through this loop connector and is moveable therethrough to vary the portion of the nose strap which encircles the dog's nose. A leash is connected to the portion of the nose strap remote from the side straps, such that pulling of the leash moves the nose strap through the first loop connector, thereby reducing and tightening the portion of the nose loop encircling the dog's nose.

Accordingly, it is an object of the invention to provide a dog halter for improved dog control, including obedience training and prevention and solution of various behavior problems.

Another object of the invention is to provide such a dog halter in which the handler's force applied through the leash is directly transmitted to the nose loop substantially independent of the neck loop.

A further object of the present invention is to provide a dog halter including interconnected neck, side, and nose straps, having substantial independence between the force applied to the nose strap and neck strap.

Another object of the present invention is to provide a dog halter made of lightweight, flexible material that cannot be removed by the dog.

Yet a further object of the present invention is to provide such a dog halter which is readily and easily adjustable in size to adapt to different dogs.

These as well as other objects and advantages of the present invention are depicted in the following drawings and described with reference to preferred embodiments.

BRIEF DESCRIPTION OF THE DRAWINGS

FIG. 2 is a side view of the halter shown in FIG. 1, as it would fit on a dog in a relaxed condition, or while barking.

FIG. 3 corresponds to FIG. 2, but shows the nose strap in a tightened condition, to thereby close the dog's mouth.

Figure 1:
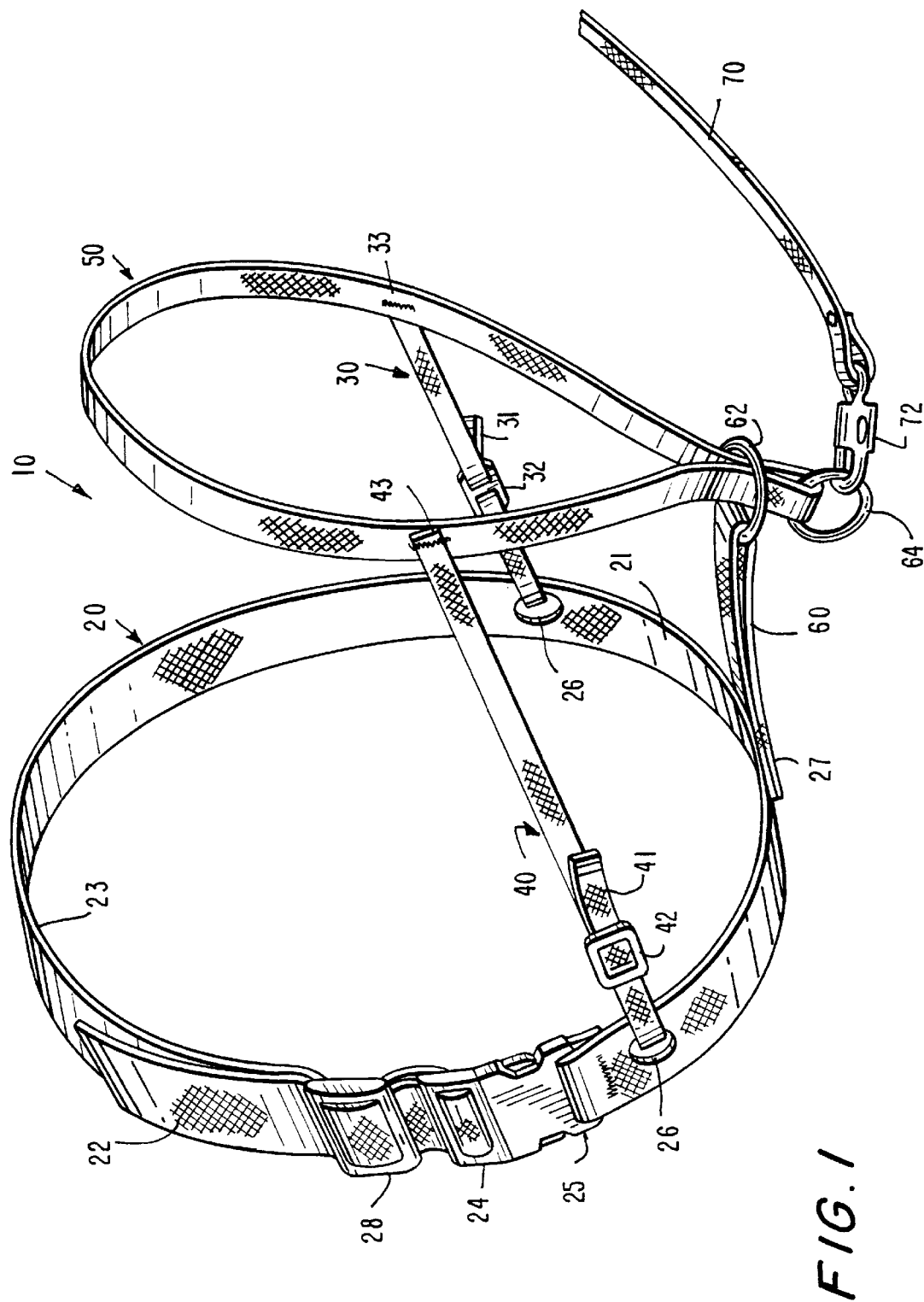
FIG. 1 is a perspective view of a first embodiment of the invention.

Reference is now initially made to FIGS. 1–3.

The dog halter 10 includes interconnected neck strap 20, side straps 30, 40, and nose strap 50. All of these straps are preferably formed of a flexible material, such as a braided fabric. Neck strap 20 is intended to encircle the dog's neck. It includes releasable buckle members 24, 25 to open the neck strap for placing or removing the entire halter 10. One of these buckles is connected to end 23 of the neck strap. The other buckle portion is connected to end 22, which also includes an adjustment buckle 28. Buckle 28 is preferably of a three bar slider type, so as to appropriately adjust the size of the neck strap between predetermined extremes to comfortably accommodate the particular dog.

Side, or cheek straps, 30, 40 are connected to spaced locations 26 along the neck strap, preferably by reinforced openings 26. This permits the side straps 30, 40 to freely move within openings 26, facilitating an adjustment in the length of the side straps 30, 40. Each of the side straps includes an adjustable buckle 32, 42, at ends 31, 41. Buckles 32, 42 may also be of the three bar slider type for adjusting the length of the side straps 30, 40. The opposite ends 33, 43 of the side straps are permanently connected, as by reinforced stitching 33, 43 to spaced locations along the nose strap 50, which are adapted to lie at opposed sides of the dog's nose. The nose strap 50 is adjustably connected to the neck strap 20 via a connecting loop 60 which may also be of the same braided fabric, which is stitched at 27 to the neck strap 20. A loop connector 62, preferably formed of metal, is located at the free end of connector 60. The nose strap 50 freely extends through the looped connector 62. The free end of nose strap 50 includes a second loop connector 64, which is also preferably formed of metal, to which a leash 70 is removably connected by conventional biased connector 72. The length (circumference) of nose loop 50 is made long enough so that a simple knot tied at the bottom of nose loop 50, at various positions above second loop connector 64, can adjust the length (circumference) of nose loop 50 so that it fits the nose of the individual dog.

During normal movement of the dog, the halter will be positioned as shown in FIG. 2. Should it be desired to provide control to the dog, as by obedience training, or to stop barking behavior, forward movement of the leash 70 through the loop connector 64 closes the portion of the nose loop 50 about the dog's nose, to the condition shown in FIG. 3, so as to rapidly and effectively close the dog's mouth and retain the mouth in that condition.

Figure 4:
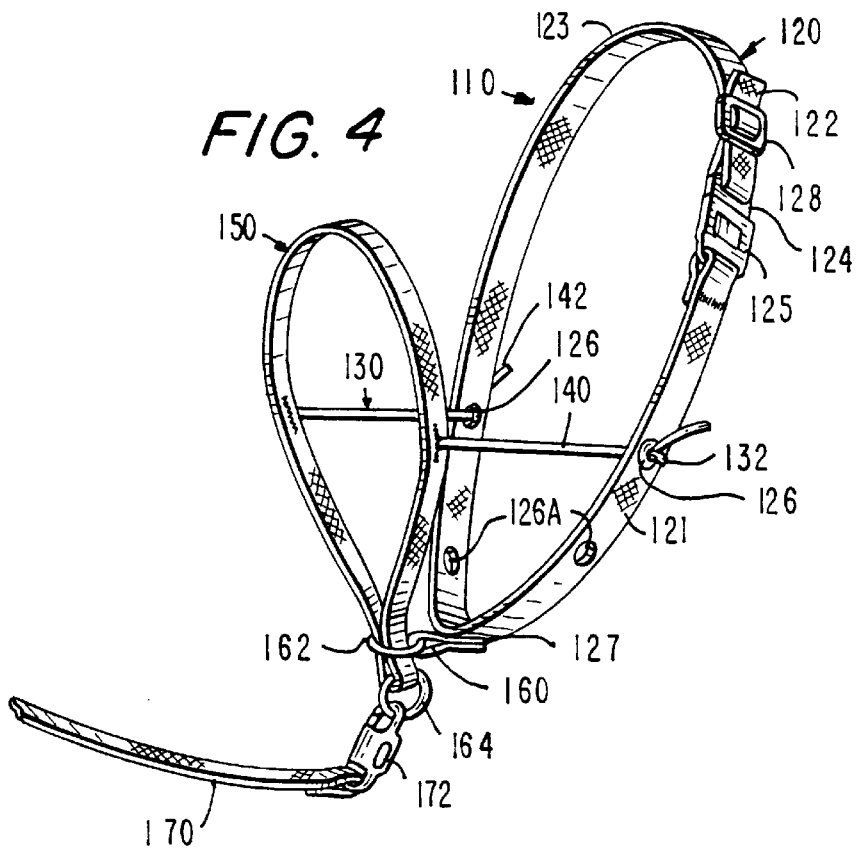
FIG. 4 is a perspective view of a second embodiment of the invention.
Figure 5:
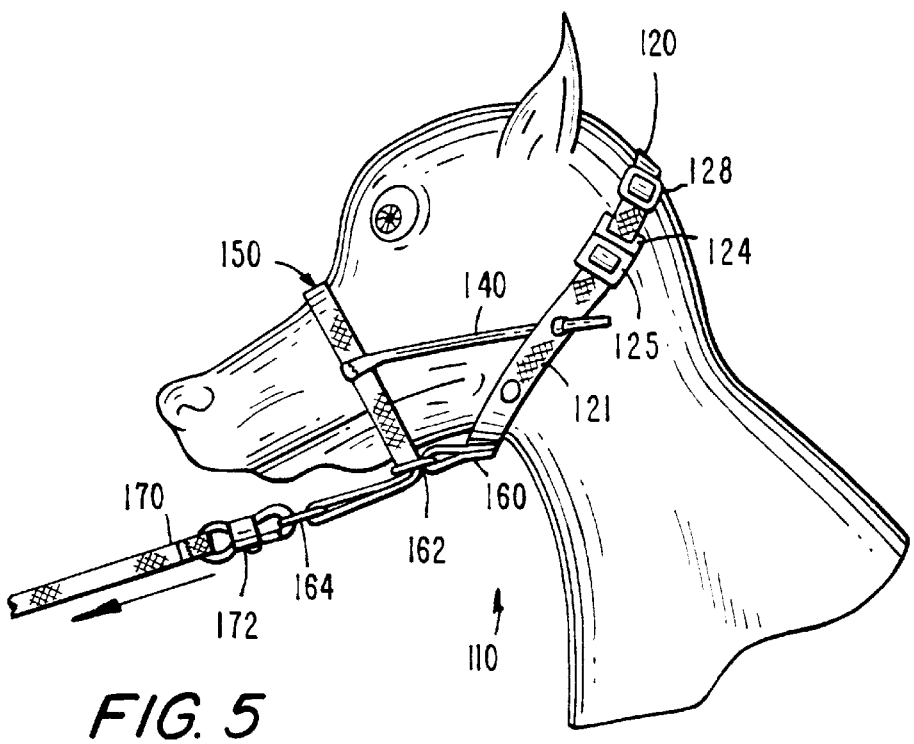
FIG. 5 is a side view of the halter shown in FIG. 4, with the nose loop in a tightened condition.

Reference is now made to FIG. 4 which shows another embodiment of the invention generally corresponding to FIGS. 1–3, but intended for dog's of a smaller size. The various components will naturally be smaller. Further, the cost of the unit can be reduced, and the flexibility and comfort increased by deleting the side buckles 32, 42 (FIGS. 1–3) and using knots 132, 142. The knots will be of sufficient size so as to prevent movement of the side straps through openings 126. An additional set of openings 126A can be provided to increase the range of adjustment.

Accordingly, we have provided an improved dog halter which directly transmits the controlling force to the nose strap about the dog's nose, substantially independent of forces applied to the neck halter, so as to both improve dog control and the attendant obedience training.

It should be appreciated that other modifications and variations are anticipated within the spirit and scope of the following claims, which define the scope of the invention.

What is claimed:

1. A dog halter comprising:
   a flexible neck strap in the form of an endless loop;
   a pair of linear flexible side straps, each having first and second ends; and
   a flexible nose strap in the form of an endless loop,
      the first ends of said side straps connected to spaced locations along said neck strap intended to lie against opposed sides of the dog's neck;
      the second ends of said side straps connected to spaced locations along said nose strap intended to lie against opposed sides of the dog's nose;
      a first loop connector attached to a location along said neck strap adapted to lie under the dog's neck;
      said nose strap freely extending through said first loop connector and movable therethrough to vary the portion of the nose strap extending above the first loop connector and about the dog's nose, the remaining portion of the nose strap extending below the first loop connector and dog's nose;
      said nose strap including stop means for limiting the extent of said nose strap extending above said first loop connector, the portion of the nose strap extending above said first loop connector being selectively established by said stop means to permit the dog to open its mouth to perform normal functions, such as eating, drinking and yawning, but sufficiently limited to inhibit placing of the loop of the nose strap within the dog's mouth;
      a leash connector at said remaining portion of the nose strap for moving said nose strap through said first loop connector with such
      movement adjusting the portion of the nose strap about the dog's nose;
      said stop means being adjustable for varying the portion of the nose strap extending above said first loop.

* * * * *